US012633164B2

(12) United States Patent
Han et al.

(10) Patent No.: US 12,633,164 B2
(45) Date of Patent: May 19, 2026

(54) APPARATUS AND METHOD FOR DETECTING EMOTIONAL CHANGE THROUGH FACIAL EXPRESSION ANALYSYS

(71) Applicant: ELECTRONICS AND TELECOMMUNICATIONS RESEARCH INSTITUTE, Daejeon (KR)

(72) Inventors: Byung-Ok Han, Daejeon (KR); Ho-Won Kim, Seoul (KR); Jang-Hee Yoo, Daejeon (KR); Cheol-Hwan Yoo, Daejeon (KR); Jae-Yoon Jang, Sejong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 286 days.

(21) Appl. No.: 18/379,020

(22) Filed: Oct. 11, 2023

(65) Prior Publication Data

US 2024/0127627 A1 Apr. 18, 2024

(30) Foreign Application Priority Data

Oct. 17, 2022 (KR) ......................... 10-2022-0132977

(51) Int. Cl.
 *G06V 40/16* (2022.01)
 *G06V 10/82* (2022.01)
(52) U.S. Cl.
 CPC ............ *G06V 40/176* (2022.01); *G06V 10/82* (2022.01); *G06V 40/161* (2022.01); *G06V 40/171* (2022.01); *G06V 40/172* (2022.01)

(58) Field of Classification Search
 CPC .... G06V 10/82; G06V 40/161; G06V 40/171; G06V 40/172; G06V 40/176
 See application file for complete search history.

(56) References Cited

U.S. PATENT DOCUMENTS 7,233,684 B2 * 6/2007 Fedorovskaya ........... G06T 7/00
707/E17.026
8,462,996 B2 6/2013 Moon et al.
(Continued)

FOREIGN PATENT DOCUMENTS

JP 2016-149063 A 8/2016
JP 2018-036734 A 3/2018
(Continued)

OTHER PUBLICATIONS

Hwooi et al, "Deep Learning-Based Approach for Continuous Affect Prediction From Facial Expression Images in Valence-Arousal Space", 2022. (Year: 2022).*
(Continued)

*Primary Examiner* — Ruiping Li
(74) *Attorney, Agent, or Firm* — LRK PATENT LAW FIRM

(57) ABSTRACT

Disclosed herein is an apparatus and method for detecting an emotional change through facial expression analysis. The apparatus for detecting an emotional change through facial expression analysis includes a memory having at least one program recorded thereon, and a processor configured to execute the program, wherein the program includes a camera image acquisition unit configured to acquire a moving image including at least one person, a preprocessing unit configured to extract a face image of a user from the moving image and preprocess the extracted face image, a facial expression analysis unit configured to extract a facial expression vector from the face image of the user and cumulatively store the facial expression vector, and an emotional change analysis (Continued)

unit configured to detect a temporal location of a sudden emotional change by analyzing an emotion signal extracted based on cumulatively stored facial expression vector values.

17 Claims, 7 Drawing Sheets

(56)                References Cited

U.S. PATENT DOCUMENTS

| | | | |
|---|---|---|---|
| 2009/0285456 A1 * | 11/2009 | Moon | G06V 40/176 382/118 |
| 2017/0311863 A1 | 11/2017 | Matsunaga | |
| 2018/0276488 A1 | 9/2018 | Yoo et al. | |
| 2022/0254191 A1 | 8/2022 | Martinez | |

FOREIGN PATENT DOCUMENTS

| | | | |
|---|---|---|---|
| KR | 10-2018-0109171 A | 10/2018 | |
| KR | 10-2019-0130179 A | 11/2019 | |
| KR | 10-2204743 B1 | 1/2021 | |
| KR | 10-2021-0030060 A | 3/2021 | |
| WO | WO-2020260862 A1 * | 12/2020 | ........... G06V 40/175 |

OTHER PUBLICATIONS

Gannouni et al., "Adaptive Emotion Detection Using the Valence-Arousal-Dominance Model and EEG Brain Rhythmic Activity Changes in Relevant Brain Lobes", 2020. (Year: 2020).*

Jiankang Deng et al., "RetinaFace: Single-shot mult-level face localization in the wild," 2020 IEEE/CVF Conference on Computer Vision and Pattern Recognition (CVPR), Jun. 1, 2020.

* cited by examiner

----► MERGING PROCESS

——► DETECTED CHANGE LOCATION

APPARATUS AND METHOD FOR DETECTING EMOTIONAL CHANGE THROUGH FACIAL EXPRESSION ANALYSYS

CROSS REFERENCE TO RELATED APPLICATION

This application claims the benefit of Korean Patent Application No. 10-2022-0132977, filed Oct. 17, 2022, which is hereby incorporated by reference in its entirety into this application.

BACKGROUND OF THE INVENTION

1. Technical Field

The following embodiments relate to technology for analyzing a facial expression of a user in a moving image including the user's face from a red-green-blue (RGB) camera equipped in an intelligent robot, an autonomous vehicle or an autism spectrum disorder inspection space.

2. Description of Related Art

The traditional artificial intelligence (AI) based facial analysis technologies have developed to focus on recognition of an emotional state from a facial expression of the user. In other words, a system that figures out human feelings by finding out a face region from an input of a red-green-blue (RGB) image of a face of the user, analyzing a facial expression in the face region and recognizing an emotional state expressed by the facial expression has been mainly developed. Specifically, an AI technology is a typical one to detect the face region in the RGB image and classify or sort out facial expressions expressed by the face to recognize six emotional states such as happy, sad, disgusting, angry, surprised and afraid.

However, to properly understand feelings of a person through facial expression analysis, it is also important to detect a point (location) of an emotional change for three reasons below, in addition to figuring out an emotional state.

Firstly, the point of an emotional change may be a crucial basis for understanding an important context or background to figure out the feelings of the person. For example, in a case that a patient, who is hospitalized and experiencing constant sad feelings, hears unexpected bad news about his/her health, a traditional technology to recognize an emotional state recognizes the feelings of the patient as constant sadness. However, when a technology that detects a change in emotion is used, it may figure out a change in emotion and a time of the change in emotion and thus properly understand the change in emotion of a target subject due to a change in context or background information.

Secondly, for a human-robot interaction or human-computer interaction system that is equipped with social intelligence, the point of the emotional change may be used as a recognition point to understand a comprehensive emotional state of the user including context or background information. For example, it is possible to use an AI technology to provide a point at which to recognize the context information (unexpected bad news about health), which is a cause of the emotional change as mentioned above in the first reason.

Thirdly, the point of emotional change may provide responsiveness information for a facial expression of another person, which plays an important role in social communication. An ability to respond to another person's feelings is a complicated ability from a social or cognitive perspective. Especially, it is known that a person who lacks social interaction and known to have autism spectrum disorder, has difficulty in responding to the other person's feelings immediately or automatically as disclosed in "J. Deng et al., "RetinaFace: Single-shot multi-level face localization in the wild," IEEE conference on Computer Vision and Pattern Recognition (CVPR), pp. 5203-5212, 2020".

Because of the aforementioned reasons, there is a need for a technology to detect a point of emotional change through facial expression analysis as well as to recognize an emotional state of the person through the facial expression analysis.

SUMMARY OF THE INVENTION

An embodiment is intended to detect a temporal location of an emotional change through facial expression analysis of a face image of a user input from a red-green-blue (RGB) camera.

In accordance with an aspect, there is provided an apparatus for detecting an emotional change through facial expression analysis, the apparatus including a memory configured to store at least one program, and a processor configured to execute the program, wherein the program includes a camera image acquisition unit configured to acquire a moving image including at least one person, a preprocessing unit configured to extract a face image of a user from the moving image and preprocess the extracted face image, a facial expression analysis unit configured to extract a facial expression vector from the face image of the user and cumulatively store the facial expression vector, and an emotional change analysis unit configured to detect a temporal location of a sudden emotional change by analyzing an emotion signal extracted based on cumulatively stored facial expression vector values.

The preprocessing unit may include a face detection unit configured to infer at least one face region from the moving image, an identity recognition unit configured to search for a face of the user through identity analysis of a person corresponding to the inferred at least one face region, a face posture extraction unit configured to extract landmark location information and posture information from the found face image of the user, and a face normalization unit configured to normalize the face image based on the extracted landmark location information and the posture information.

The memory may be further configured to store a pre-trained deep learning network for identity recognition and verification, and wherein the identity recognition unit is configured to pre-store a first feature vector output by the deep learning network with an input of a pre-acquired face image of the user, and extract at least one second feature vector output by the deep learning network with an input of each image corresponding to at least one face region included in the image, and determine a face image of a face region, having a confidence score obtained by scoring similarity between the first feature vector and each of the at least one second feature vector equal to or greater than a certain threshold, to be the user.

The face normalization unit may be configured to transform the face image based on a location of the extracted landmark or filter a face image to be analyzed based on the extracted posture information.

The facial expression analysis unit may include a facial expression classify inference unit configured to extract seven dimensional (7D) confidence score vector of an emotion category model from the normalized face image, and a facial expression dimension inference unit configured to two-dimensionally add dimensional regression result values of valence and arousal of a facial expression dimension model.

The emotional change analysis unit may include a signal extraction unit configured to extract an emotion signal from a cumulative value of a multi-dimensional facial expression vector extracted from a face image, a signal refinement unit configured to cancel noise from the extracted emotion signal, and a change location detection unit configured to detect a temporal location at which a change rate and magnitude of the emotion signal are equal to or greater than a certain threshold, based on the emotion signal with the noise canceled.

The emotional change analysis unit may be configured to split an emotion signal of a whole moving image into sub-signals in certain length when the moving image is terminated and detect a change location based on a difference between successive sub-signals, in a case where the moving image is input offline.

The emotional change analysis unit may be configured to calculate a gradient value by differentiating the emotion signal of the moving image of a signal length designated by the user and to determine whether a current facial expression vector value corresponds to a change location by comparing a gradient value of a past signal and a current gradient value, in a case where the moving image is input online in real time.

In accordance with another aspect, there is provided a method of detecting an emotional change through facial expression analysis, the method including acquiring a moving image including at least one person, extracting a face image of a user from the moving image and preprocessing the extracted face image, extracting a facial expression vector from the face image of the user and cumulatively storing the facial vector, and detecting a temporal location of a sudden emotional change by analyzing an emotion signal extracted based on the cumulatively stored facial expression vector values.

Preprocessing the extracted face image may include inferring at least one face region from the moving image, searching for a face of the user through identity analysis of a person corresponding to the inferred at least one face region, extracting landmark location information and posture information from the found face image of the user; and normalizing the face image based on the extracted landmark location information and the posture information.

Searching for the face of the user through identity analysis may include pre-storing a first feature vector output by a deep learning network with an input of a pre-acquired face image of the user, and extracting at least one second feature vector output by the deep learning network with an input of each image corresponding to at least one face region included in the image, and determining a face image of a face region, having a confidence score obtained by scoring similarity between the first feature vector and each of the at least one second feature vector equal to or greater than a certain threshold, to be the user, wherein the deep learning network is pre-trained for identity recognition and verification.

Normalizing the face image may include transforming the face image based on a location of the extracted landmark or filtering a face image to be analyzed based on the extracted posture information.

Extracting and cumulatively storing the facial expression vector may include extracting a seven dimensional (7D) confidence score vector of an emotion category model from the normalized face image, and two-dimensionally adding dimensional regression result values of valence and arousal of a facial expression dimension model.

Detecting the temporal location of the sudden emotional change may include extracting an emotion signal from a cumulative value of a multi-dimensional facial expression vector extracted from a face image, canceling noise from the extracted emotion signal, and detecting a temporal location at which a change rate and magnitude of the emotion signal are equal to or greater than a certain threshold, based on the emotion signal with the noise canceled.

Detecting the temporal location of a sudden emotional change may include splitting an emotion signal of a whole moving image into sub-signals in certain length when a moving image is terminated and detecting a change location based on a difference between successive sub-signals, when the moving image is input offline.

Detecting the temporal location of a sudden emotional change may include calculating a gradient value by differentiating the emotion signal of the moving image of a signal length designated by the user and determining whether a current facial expression vector value corresponds to a change location by comparing a gradient value of a past signal and a current gradient value, in a case where the moving image is input online in real time.

In accordance with a further aspect, there is provided a method of detecting an emotional change through facial expression analysis, the method including acquiring a moving image including at least one person, extracting a face image of a user identified from the moving image, extracting a multi-dimensional facial expression vector from the face image of the user and cumulatively storing the facial expression vector, extracting an emotion signal from a cumulative value of the multi-dimensional facial expression vector, and detecting a temporal location at which a change rate and magnitude of the emotion signal are equal to or greater than a certain threshold, based on the extracted emotion signal.

The method may include further include extracting landmark location information and posture information from the found face image of the user, and normalizing the face image based on the extracted landmark location information and the posture information.

Extracting and cumulatively storing the facial expression vector may include extracting a seven dimensional (7D) confidence score vector of an emotion category model from the normalized face image, and two-dimensionally adding dimensional regression result values of valence and arousal of a facial expression dimension model.

Detecting the temporal location of a sudden emotional change may include dividing an emotion signal of the whole moving image into sub-signals in certain length and detecting a point of change based on a difference between successive sub-signals, when the moving image is input offline and terminated, and calculating a gradient value by differentiating the emotion signal of the moving image of a signal length designated by the user and determining whether a current facial expression vector value corresponds to a change location by comparing a gradient value of a past signal and a current gradient value, in a case where the moving image is input online in real time.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
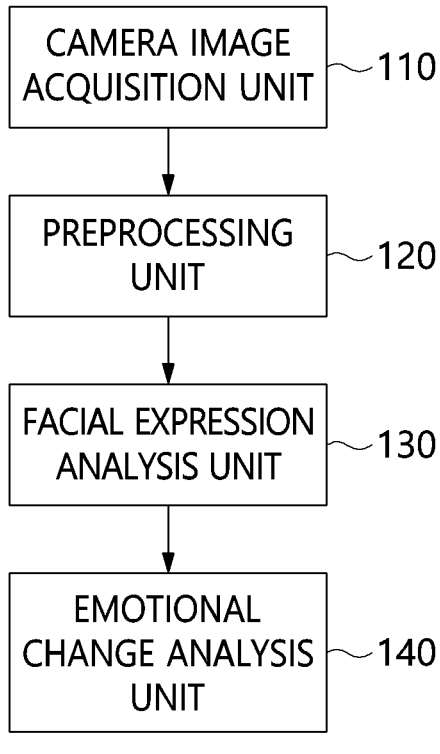
FIG. 1 is a block diagram of an apparatus for detecting an emotional change through facial expression analysis according to an embodiment.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

An apparatus and method for detecting an emotional change through facial expression analysis according to embodiments of the disclosure will now be described in detail in connection with FIGS. 1 to 7.

The embodiments of the disclosure are directed to a technology that uses a moving image (or video) including a face of a user input from a red-green-blue (RGB) camera equipped in an intelligent robot, an autonomous vehicle, an autism spectrum disorder inspection space, or the like and detects a temporal location in the moving image where there is a relatively big or deep change in facial expression of the user.

FIG. 1 is a block diagram of an apparatus for detecting an emotional change through facial expression analysis, according to an embodiment.

Referring to FIG. 1, an apparatus 100 for detecting an emotional change through facial expression analysis according to an embodiment may include a camera image acquisition unit 110, a preprocessing unit 120, a facial expression analysis unit 130, and an emotional change analysis unit 140.

The camera image acquisition unit 110 acquires an RGB moving image or a real-time RGB image in which at least one person is included. In this regard, depending on whether the moving image is acquired in real time, different algorithms for detecting a location of change may be applied in later detection of a location of a change. Furthermore, the camera image acquisition unit 110 may acquire an RGB image by using a webcam, an Internet protocol (IP) camera, a kinect camera, etc.

The preprocessing unit 120 extracts and preprocesses a face image of the user from the acquired RGB image. This will be described in detail later in connection with FIG. 2.

The facial expression analysis unit 130 extracts a facial expression vector from the extracted face image of the user. It cumulatively stores the facial expression vector until the moving image is terminated or a request to analyze the emotional change is received from the user. This will be described in detail later in connection with FIGS. 2 and 3.

The emotional change analysis unit 140 generates an emotion signal based on the facial expression vector values stored cumulatively, analyzes the generated emotion signal and finally detects a location where there is a sudden emotional change. This will be described in detail later in connection with FIGS. 2 and 4.

Figure 2:
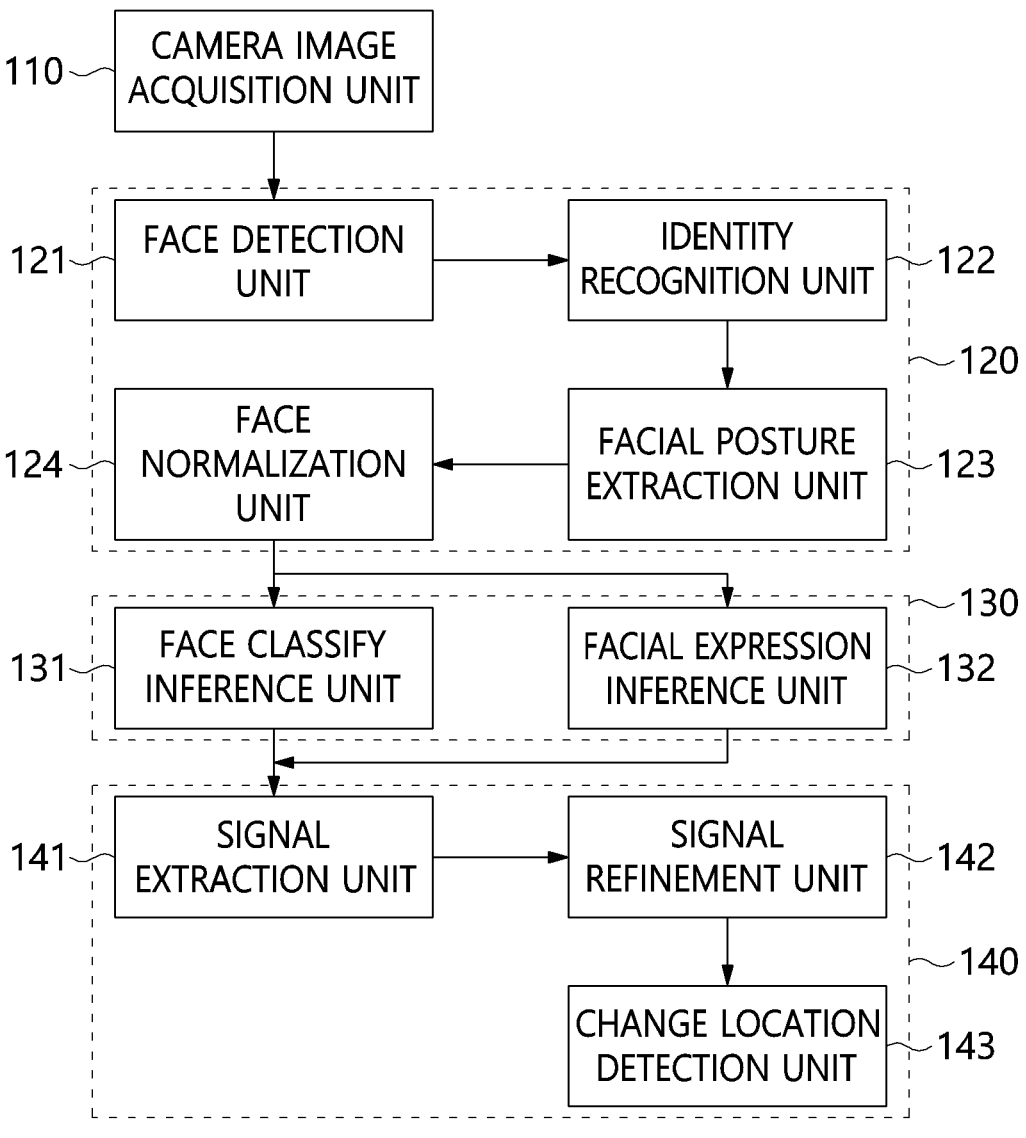
FIG. 2 is a detailed block diagram of an apparatus for detecting an emotional change through facial expression analysis according to an embodiment.

FIG. 2 is a detailed block diagram of an apparatus for detecting an emotional change through facial expression analysis, according to an embodiment.

Referring to FIG. 2, the preprocessing unit 120 may include a face detection unit 121, an identity recognition unit 122, a facial posture extraction unit 123 and a face normalization unit 124.

The face detection unit 121 receives an RGB image to infer a face region of a person. In this case, when there are many people in the RGB image, there may be multiple face regions.

For a face detection algorithm, RetinaFace, MTCNN and a Viola-Jones face detection unit with a trained Adaboost classifier may be used to detect the face.

The identity recognition unit 122 searches for a face of the user through identity analysis of a person corresponding to the inferred at least one face region.

In this case, for identity recognition or verification, a pre-trained deep learning network (e.g., ResNet, MobileNet, etc.) is stored in advance, and the identity recognition unit 122 pre-stores a first feature vector output by the deep learning network with an input of a face image of the user acquired in advance through a separate identity information input process.

The identity recognition unit 122 may then extract at least one second feature vector output by the deep learning network with an input of each image corresponding to at least one face region included in the image, and determine a face image of a face region, having a confidence score obtained by scoring similarity between the first feature vector and each of the at least one second feature vector equal to or greater than a certain threshold, to be the user.

The face posture extraction unit 123 extracts information for normalizing an input of the face image to be analyzed by extracting landmark (eyes, nose, mouth, etc.) location information and posture information (roll, pitch, or yaw) of the face image. In this case, the face landmark may be extracted by applying an algorithm such as pre-trained deep learning based RetinaFace, MTCNN, etc.

The face normalization unit 124 normalizes the face image based on the landmark location information and posture information extracted by the face posture extraction unit 123. This may align face images to improve facial expression analysis performance.

In an embodiment, the face normalization unit 124 may transform the face image by aligning eyes of the image based on the landmark location, e.g., a position of eyes, of the input face image.

In another embodiment, the face normalization unit 124 may filter the face image to be analyzed based on the extracted posture information. For example, face images to be input to facial expression analysis may be refined by excluding face images that deviate a lot from the front.

Turning back to FIG. 2, the facial expression analysis unit 130 may include a facial expression classify inference unit 131 and a facial expression dimension inference unit 132. The facial expression analysis unit 130 is configured by receiving an input of a facial expression image and a facial expression label and training a deep learning network that classifies or regresses the facial expression.

The facial expression classify inference unit 131 extracts a multi-dimensional emotion signal by extracting a confidence score vector of a classification result of facial expression recognition of a face category model (P. Ekman and D. Keltner, "Universal facial expressions of emotion," nonverbal Communication: Where Nature Meets Culture, pp. 27-46, 1997) from the normalized face image.

In this case, a multi-dimensional emotion signal may be, for example, a seven dimensional (7D) emotion signal, and a Softmax result value represented with a probability value of the deep learning network may be used to classify facial expressions such as happy, sad, disgusting, angry, surprised, afraid, and neutral.

The facial expression dimension inference unit 132 adds a multi-dimensional facial expression vector by using a facial expression regression result value such as valence, arousal, etc., of a facial expression dimension model (J. A. Russell, "A circumplex model of affect." Journal of Personality and Social Psychology, vol. 39, no. 6, p. 1161, 1980) to interpret the feelings from a different perspective in addition to the emotion category model.

The facial expression analysis unit 130 may configure a total of nine dimensional (9D) emotion signal by two-dimensionally adding the dimensional regression result values such as valence and arousal of the facial expression dimension model and 7D confidence score vector of the emotion category model with an input of the normalized face image.

Figure 3:
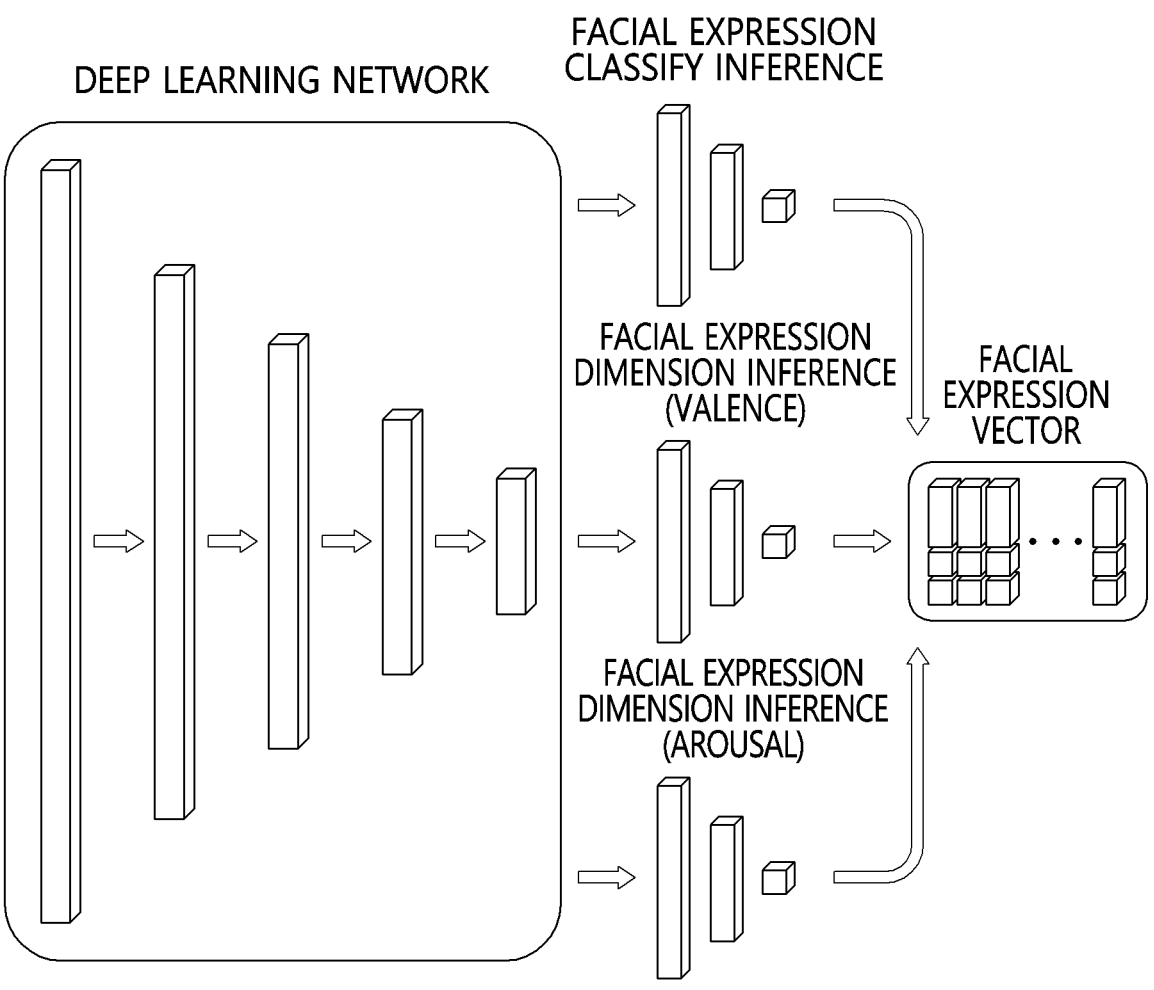
FIG. 3 is a diagram illustrating a deep learning network of a facial expression analysis unit according to an embodiment.

FIG. 3 is a diagram illustrating a deep learning network of a facial expression analysis unit according to an embodiment.

Referring to FIG. 3, a 9D cumulative facial expression vector may be accumulated by using the deep learning network to configure 7D facial expression classification result values and 2D facial expression dimension inference result values.

Turning back to FIG. 2, the emotional change analysis unit 140 may include a signal extraction unit 141, a signal refinement unit 142 and a change location detection unit 143.

The signal extraction unit 141 extracts an emotion signal to be analyzed from a cumulative value of the multi-dimensional facial expression vector extracted from a face image.

In an embodiment, the signal extraction unit 141 may extract only one dimensional (1D) happiness vector from a multi-dimensional time-series facial expression vector and configure it into a one dimensional emotion signal.

In another embodiment, the signal extraction unit 141 may use all facial expression vectors in all dimensions to configure a 9D emotion signal.

The signal refinement unit 142 removes outliers of the emotion signal by performing noise cancellation on the extracted emotion signal. In this case, as a signal refinement unit algorithm, a Savitzky-Golay filter for canceling noise while keeping the shape such as signal peak height may be used.

The change location detection unit 143 detects a temporal location where a change rate and magnitude of an emotion signal are equal to or greater than a certain threshold based on the emotion signal from which noise is canceled. In other words, a temporal location at which a final emotion signal has a sudden or big change is detected.

In this case, the change location detection unit 143 may perform an offline change location detection algorithm or an online change location detection algorithm depending on the type of the input image.

While the offline change location detection algorithm receives all the emotion signals in the whole moving image to search for a change location, the online change location detection algorithm may output a result value of whether a currently input facial expression vector value corresponds to a change location based on a past signal when a signal length designated by the user is reached.

For the offline change location detection algorithm, a bottom-up merge (S. Chen, P. Gopalakrishnan, "Speaker, environment and channel change detection and clustering via the Bayesian information criterion," in DARPA Broadcast News Transcription and Understanding Workshop, vol. 8, 1998, pp. 127-132.) algorithm may be used in an embodiment. The bottom-up merge algorithm splits the whole signal into sub-signals and detects a change location based on a difference between successive sub-signals. For example, when the difference is relatively big or greater than a threshold designated by the user, a location at which the successive sub-signals are split is detected as a change location.

Figure 4:
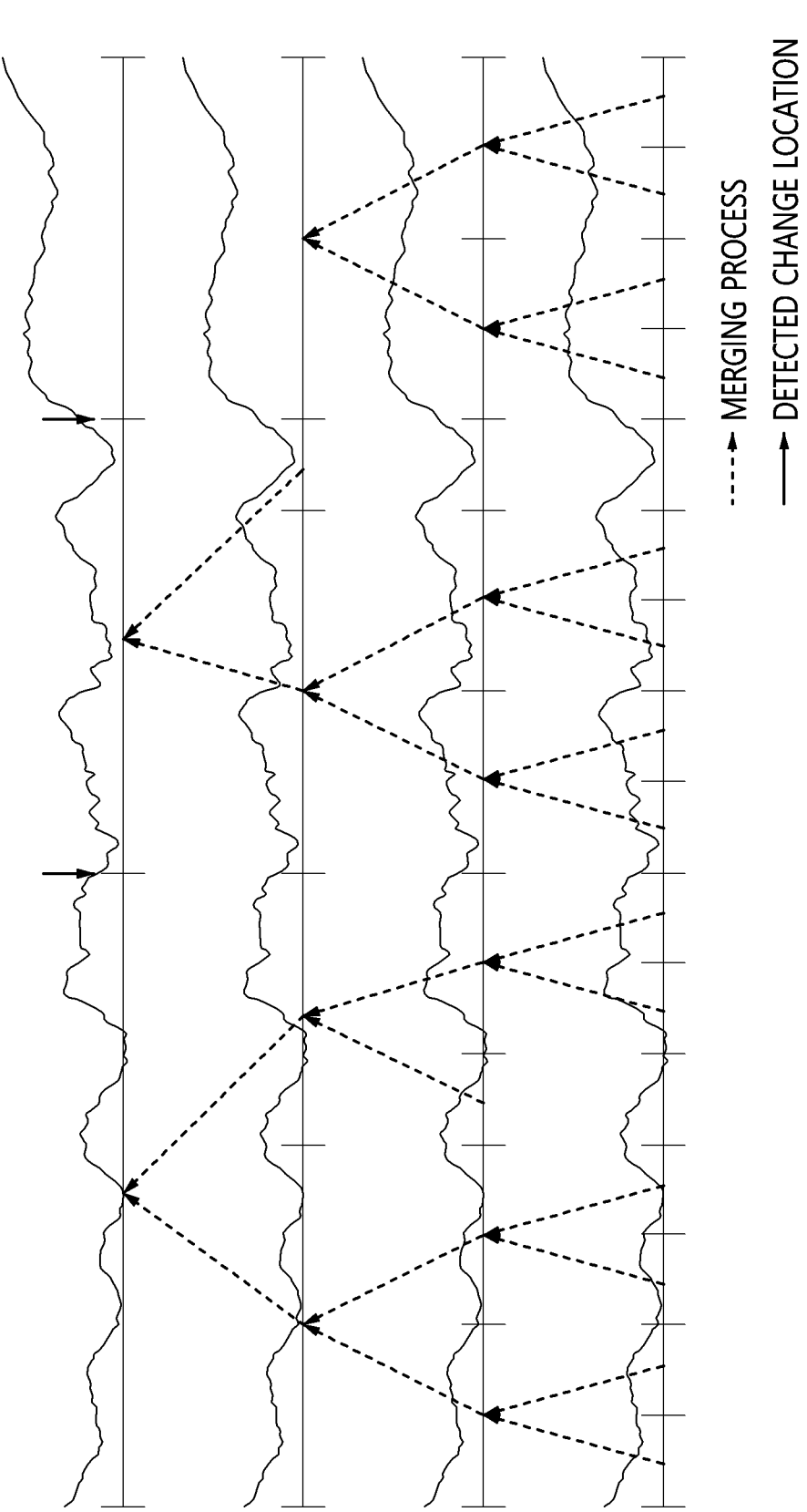
FIG. 4 illustrates detection of a change in a bottom-up merge algorithm.

FIG. 4 illustrates detection of a change in a bottom-up merge algorithm.

Referring to FIG. 4, the whole signal is split into sub-signals of certain length, and a difference between successive sub-signals is calculated. After this, when the difference is less than a threshold designated by the user, merging is performed, and otherwise, merging is not performed. By performing such operations repetitively, a location having a big change in the whole signals is found.

In this case, a difference between signals may be calculated by using L2-distance, L1-distance, etc.

In another embodiment, for the offline change location detection algorithm, binary segmentation (J. Chen and A. K.

Gupta, Parametric statistical change point analysis: with applications to genetics, medicine, and finance. Springer 2012), sliding window (K. Karagiannaki, A. Panousopoulou, and P. Tsakalides, "An online feature selection architecture for human activity recognition," in IEEE International Conference on Acoustics, Speech and Signa Processing (ICASSP), 2017, pp. 2522-2526.), dynamic programming (M. Lavielle, "Using penalized contrasts for the change-point problem," Signal Processing, vol. 85, no. 8, pp. 1501-1510, 2005.) and pruned exact linear time (R. Killick, P. Fearnhead, and I. A. Eckley, "Optimal detection of changepoints with a linear computational cost," Journal of the American Statistical Association, vol. 107, no. 500, pp. 1590-1598, 2012.), etc., may be used.

In the meantime, the online change location detection algorithm may analyze past signals to detect whether the current facial expression vector value corresponds to a change location by simply using a gradient based algorithm in an embodiment. Specifically, the gradient based algorithm may calculate a gradient value by differentiating the past signal of a length designated by the user, and detect a time when the current gradient value calculated as being relatively greater than all gradient values of the past signal or the current gradient value calculated as being equal to or greater than a threshold designated by the user as a change location.

The online change location detection algorithm may detect a change location by calculating the probability of a possibility of a current emotion signal being changed as compared to the past signal based on the Bayesian algorithm in another embodiment.

In this case, inputs to the change location detection algorithm may be configured with multi-dimensional signals, and the change location detection unit 143 performs change location detection as a final result by integrating and analyzing a change location result of the multi-dimensional signal.

Furthermore, the number of change locations to be finally output using the aforementioned change location detection algorithm may be output by finding a location having the biggest change (e.g., Top-5, Top-1, etc.) or determining a location having a degree of change equal to or greater than a threshold designated by the user.

In an embodiment, a method of detecting an emotional change through facial expression analysis includes acquiring a moving image including at least one person, extracting a face image of a user from the moving image and preprocessing the extracted face image, extracting a facial vector from the face image of the user and cumulatively storing the facial vector, and detecting a temporal location of a sudden emotional change by analyzing an emotion signal extracted based on cumulatively stored facial expression vector values.

There may be two embodiments of the method of detecting an emotional change through facial expression analysis depending on whether the moving image is acquired in real time.

In a method of detecting an emotional change through facial expression analysis according to an embodiment, an offline change location detection algorithm may be performed when a moving image captured in advance is acquired.

In a method of detecting an emotional change through facial expression analysis according to another embodiment, an online change location detection algorithm may be performed when a real-time moving image is acquired.

Figure 5:
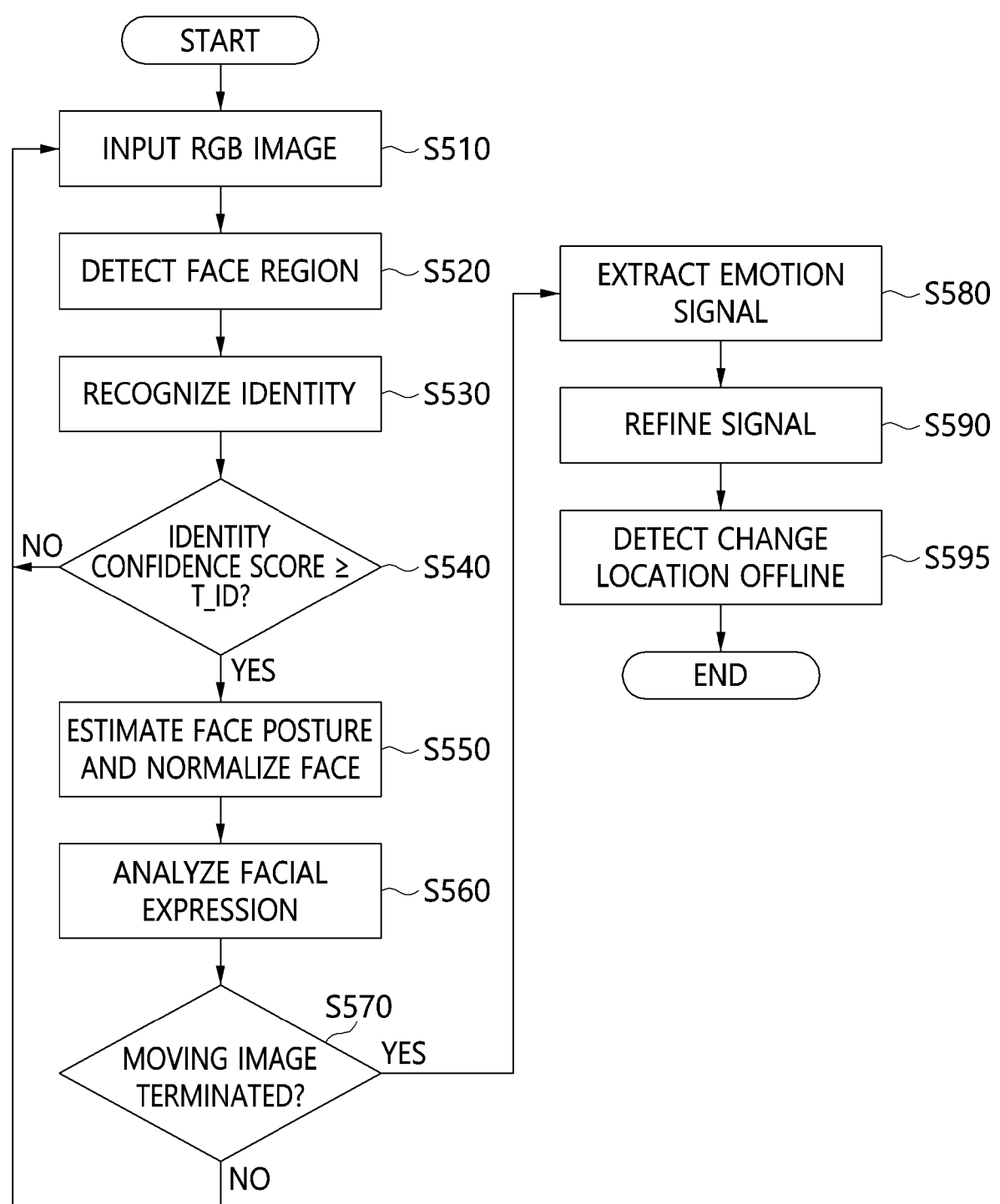
FIG. 5 is a flowchart for explaining a method of detecting an emotional change through facial expression analysis according to an embodiment.

FIG. 5 is a flowchart for explaining a method of detecting an emotional change through facial expression analysis according to an embodiment.

Referring to FIG. 5, when an input of an RGB moving image (video) including at least one person is input at step S510, an apparatus for detecting an emotional change through facial expression analysis (hereinafter, denoted as an apparatus) 100 infers at least one face region from the RGB moving image at step S520.

The apparatus 100 then searches for a face of the user through identity analysis of a person corresponding to the inferred at least one face region at step S530.

In this case, a first feature vector output by a deep learning network with an input of a pre-acquired face image of the user may be stored in advance.

The apparatus 100 may then extract at least one second feature vector output by the deep learning network with an input of each image corresponding to the at least one face region included in the image.

The apparatus 100 determines whether an identity confidence score from identity recognition is equal to or greater than a threshold T_id designated by the user, at step S540. In other words, a face image of a face region, having a confidence score obtained by scoring similarity between the first feature vector and each of the at least one second feature vector equal to or greater than a certain threshold, is determined to be the user.

When the identity confidence score is not equal to or greater than the threshold T_id designated by the user as a result of the determining at step S540, the apparatus 100 returns to step S510 to acquire a face image of the user again.

On the other hand, when the identity confidence score is equal to or greater than the threshold T_id designated by the user as a result of the determining at step S540, the apparatus 100 may extract landmark location information and posture information from the found face image of the user and normalize the face image based on the extracted landmark location information and posture information, at step S550.

The normalizing of the face image may include transforming the face image based on the extracted landmark location or filtering the face image to be analyzed based on the extracted posture information.

Subsequently, the apparatus 100 may analyze a facial expression from the normalized face image of the user, at step S560.

In this case, the apparatus 100 may extract 7D confidence score vector of an emotion category model from the normalized face image and two dimensionally add dimensional regression result values of valence and arousal of a facial expression dimension model.

The apparatus 100 checks whether the moving image is terminated at step S570 and repetitively performs steps S510 and S560 until the termination of the moving image.

The apparatus 100 extracts an emotion signal from a cumulative value of a multi-dimensional facial expression vector extracted from the face image at step S580 after the termination of the moving image, cancels noise from the extracted emotion signal at step S590, and detects a temporal location at which a change rate and magnitude of the emotion signal are equal to or greater than a certain threshold, based on the emotion signal with the noise canceled at step S595.

In this case, the apparatus 100 may use the offline change location detection algorithm at step S595 to split an emotion signal of the whole moving image into sub-signals in certain length and detect the change location based on a difference between successive sub-signals.

Figure 6:
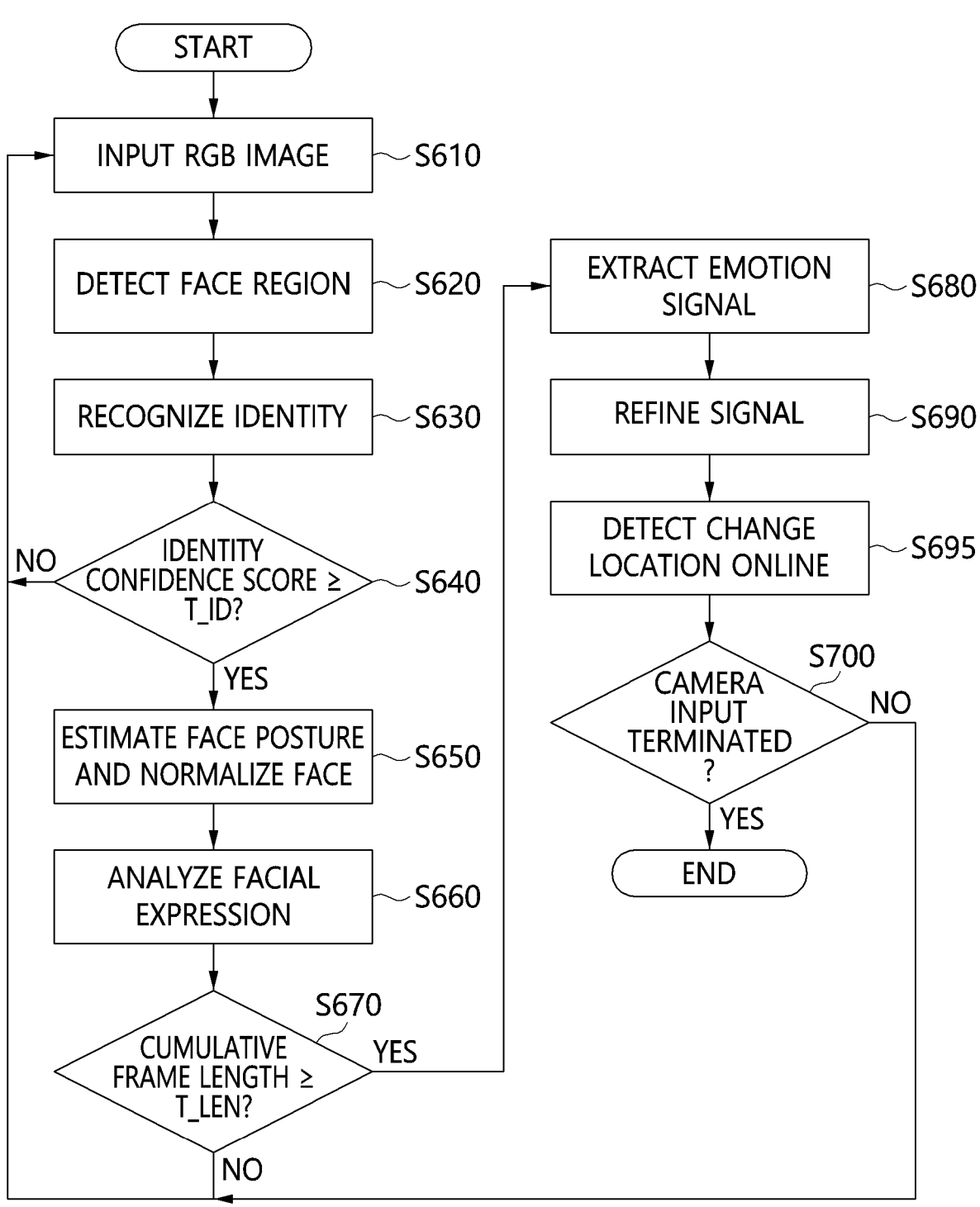
FIG. 6 is a flowchart for explaining a method of detecting an emotional change through facial expression analysis according to another embodiment.

FIG. 6 is a flowchart for explaining a method of detecting an emotional change through facial expression analysis according to another embodiment.

Referring to FIG. 6, when an RGB moving image (video) including at least one person is input in real time at step S610, the apparatus 100 infers at least one face region from the moving image input in real time at step S620.

The apparatus 100 then searches for a face of the user through identity analysis of a person corresponding to the inferred at least one face region at step S630.

In this case, a first feature vector output by a deep learning network with an input of a pre-acquired face image of the user may be stored in advance.

The apparatus 100 may then extract at least one second feature vector output by the deep learning network with an input of each image corresponding to the at least one face region included in the image.

The apparatus 100 determines whether an identity confidence score from identity recognition is equal to or greater than a threshold T_id designated by the user, at step S640. In other words, a face image of a face region having a confidence score obtained by scoring similarity between the first feature vector and each of the at least one second feature vector equal to or greater than a certain threshold is determined to be the user.

When the identity confidence score is not equal to or greater than the threshold T_id designated by the user as a result of the determining at step S640, the apparatus 100 returns to step S610 to acquire a face image of the user again.

On the other hand, when the identity confidence score is equal to or greater than the threshold T_id designated by the user as a result of the determining at step S640, the apparatus 100 may extract landmark location information and posture information from the found face image of the user and normalize the face image based on the extracted landmark location information and posture information, at step S650.

The normalizing of the face image may include transforming the face image based on the extracted landmark location or filtering the face image to be analyzed based on the extracted posture information.

Subsequently, the apparatus 100 may analyze a facial expression from the normalized face image of the user, at step S660.

In this case, the apparatus 100 may extract 7D confidence score vector of an emotion category model from the normalized face image and two dimensionally add dimensional regression result values of valence and arousal of a facial expression dimension model.

The apparatus 100 checks whether cumulative frames have a length equal to or greater than a length T_Len designated by the user at step S670 and repetitively performs steps S610 to S660 until the length of the cumulative frames reaches the length T_Len designated by the user.

The apparatus 100 extracts an emotion signal from a cumulative value of a multi-dimensional facial expression vector extracted from the face image at step S680 after the termination of the moving image, cancels noise from the extracted emotion signal at step S690, and detects a temporal location at which a change rate and magnitude of the emotion signal are equal to or greater than a certain threshold, based on the emotion signal with the noise canceled at step S695.

In this case, the apparatus 100 may use the online change location detection algorithm to calculate a gradient value by differentiating the emotion signal of the moving image of a signal length designated by the user, and determine whether a current facial expression vector value corresponds to a change location by comparing a gradient value of a past signal and a current gradient value.

Subsequently, the apparatus 100 repetitively performs steps S610 to S695 until the termination of input of real-time moving image captured by the camera at step S700.

Figure 7:
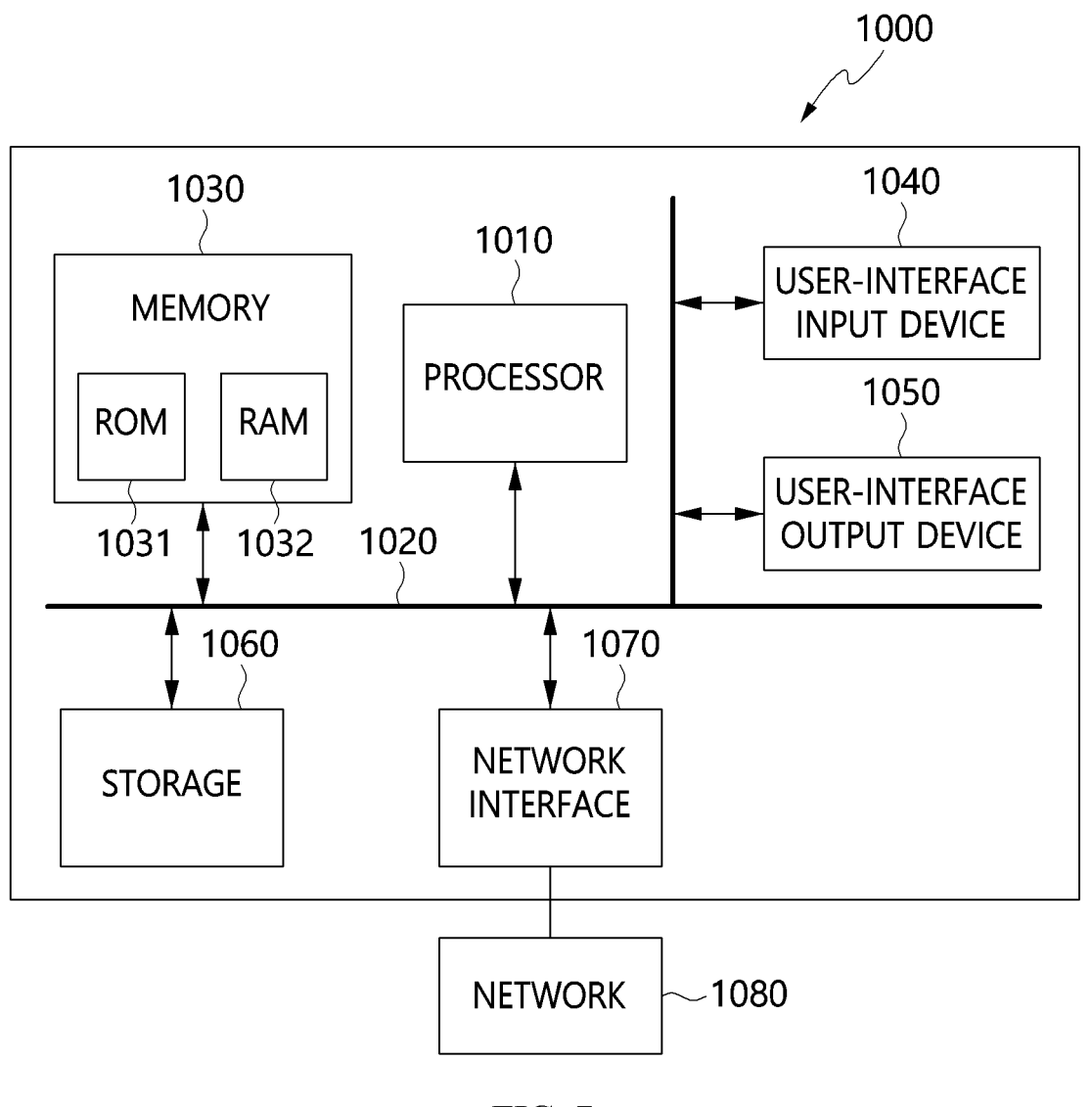
FIG. 7 is a diagram illustrating a computer system, according to an embodiment.

FIG. 7 is a diagram illustrating a computer system according to an embodiment.

The apparatus 100 for detecting an emotional change through facial expression analysis according to the embodiments of the disclosure may be implemented in a computer system 1000 such as a computer-readable recording medium.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, and an information delivery medium. For example, the memory 1030 may include Read-Only Memory (ROM) 1031 or Random Access Memory (RAM) 1032.

The one or more processors 1100 may execute one or more programs. The program may include the camera image acquisition unit 110, the preprocessing unit 120, the facial expression analysis unit 130 and the emotional change analysis unit 140.

According to embodiments, a temporal location of an emotional change may be detected through facial expression analysis of a face image of a user input from an RGB camera.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. An apparatus for detecting an emotional change through facial expression analysis, the apparatus comprising:
   a memory configured to store at least one program; and
   a processor configured to execute the program,
   wherein the program comprises:
   a camera image acquisition unit configured to acquire a moving image including at least one person;
   a preprocessing unit configured to extract a face image of a user from the moving image and preprocess the extracted face image;
   a facial expression analysis unit configured to extract a facial expression vector from the face image of the user and cumulatively store the facial expression vector; and
   an emotional change analysis unit configured to detect a temporal location of a sudden emotional change at which a change rate and magnitude of the emotion signal are equal to or greater than a certain threshold by analyzing an emotion signal extracted based on cumulatively stored facial expression vector values, wherein the emotional change analysis unit is configured to split an emotion signal of a whole moving image into sub-signals in certain length when the moving image is terminated, calculate a difference between successive sub-signals, and repetitively perform merging based on whether a calculated difference is less than a threshold designated by a user so as to detect, as the change location, a location having a large change in the whole emotion signal, in a case where the moving image is input offline, wherein the emotional change analysis unit is configured to calculate a gradient value by differentiating the emotion signal of the moving image of a signal length designated by the user and to determine whether a current emotion signal corresponds to a change location by comparing a gradient value of a past signal and a current gradient value, in a case where the moving image is input online in real time.

2. The apparatus of claim 1, wherein the preprocessing unit comprises:

a face detection unit configured to infer at least one face region from the moving image;

an identity recognition unit configured to search for a face of the user through identity analysis of a person corresponding to the inferred at least one face region;

a face posture extraction unit configured to extract landmark location information and posture information from the found face image of the user; and a face normalization unit configured to normalize the face image based on the extracted landmark location information and the posture information.

3. The apparatus of claim 2, wherein the memory is further configured to store a pre-trained deep learning network for identity recognition and verification, and wherein the identity recognition unit is configured to:

pre-store a first feature vector output by the deep learning network with an input of a pre-acquired face image of the user, and extract at least one second feature vector output by the deep learning network with an input of each image corresponding to at least one face region included in the image, and determine a face image of a face region, having a confidence score obtained by scoring similarity between the first feature vector and each of the at least one second feature vector equal to or greater than a certain threshold, to be the user.

4. The apparatus of claim 2, wherein the face normalization unit is configured to transform the face image based on a location of the extracted landmark or filter a face image to be analyzed based on the extracted posture information.

5. The apparatus of claim 1, wherein the facial expression analysis unit comprises:

a facial expression classify inference unit configured to extract seven dimensional (7D) confidence score vector of an emotion category model from the normalized face image; and a facial expression dimension inference unit configured to two-dimensionally add dimensional regression result values of valence and arousal of a facial expression dimension model.

6. The apparatus of claim 1, wherein the emotional change analysis unit comprises:

a signal extraction unit configured to extract an emotion signal from a cumulative value of a multi-dimensional facial expression vector extracted from a face image;

a signal refinement unit configured to cancel noise from the extracted emotion signal; and a change location detection unit configured to detect a temporal location at which a change rate and magnitude of the emotion signal are equal to or greater than a certain threshold, based on the emotion signal with the noise canceled.

7. The apparatus of claim 1, wherein the change location is output by selecting, among detected change locations, a location having a greatest degree of change according to a number designated by a user, or by determining a location having a degree of change equal to or greater than a threshold designated by the user.

8. A method of detecting an emotional change through facial expression analysis, the method comprising:

acquiring a moving image including at least one person;

extracting a face image of a user from the moving image and preprocessing the extracted face image;

extracting a facial expression vector from the face image of the user and cumulatively storing the facial vector; and detecting a temporal location of a sudden emotional change at which a change rate and magnitude of the emotion signal are equal to or greater than a certain threshold by analyzing an emotion signal extracted based on the cumulatively stored facial expression vector values, wherein detecting the temporal location of a sudden emotional change comprises:

splitting an emotion signal of a whole moving image into sub-signals in certain length when a moving image is terminated, calculating a difference between successive sub-signals, and repetitively performing merging based on whether a calculated difference is less than a threshold designated by a user so as to detect, as the change location, a location having a large change in the whole emotion signal, when the moving image is input offline, wherein detecting the temporal location of a sudden emotional change comprises:

calculating a gradient value by differentiating the emotion signal of the moving image of a signal length designated by the user and determining whether a current emotion signal corresponds to a change location by comparing a gradient value of a past signal and a current gradient value, in a case where the moving image is input online in real time.

9. The method of claim 8, wherein preprocessing the extracted face image comprises:

inferring at least one face region from the moving image;

searching for a face of the user through identity analysis of a person corresponding to the inferred at least one face region;

extracting landmark location information and posture information from the found face image of the user; and normalizing the face image based on the extracted landmark location information and the posture information.

10. The method of claim 9, wherein searching for the face of the user through identity analysis comprises:

pre-storing a first feature vector output by a deep learning network with an input of a pre-acquired face image of the user; and extracting at least one second feature vector output by the deep learning network with an input of each image corresponding to at least one face region included in the image, and determining a face image of a face region, having a confidence score obtained by scoring similarity between the first feature vector and each of the at least one second feature vector equal to or greater than a certain threshold, to be the user, wherein the deep learning network is pre-trained for identity recognition and verification.

11. The method of claim 9, wherein normalizing the face image comprises:

transforming the face image based on a location of the extracted landmark or filtering a face image to be analyzed based on the extracted posture information.

12. The method of claim 8, wherein extracting and cumulatively storing the facial expression vector comprises:

extracting a seven dimensional (7D) confidence score vector of an emotion category model from the normalized face image; and two-dimensionally adding dimensional regression result values of valence and arousal of a facial expression dimension model.

13. The method of claim 8, wherein detecting the temporal location of the sudden emotional change comprises:

extracting an emotion signal from a cumulative value of a multi-dimensional facial expression vector extracted from a face image;

canceling noise from the extracted emotion signal; and detecting a temporal location at which a change rate and magnitude of the emotion signal are equal to or greater than a certain threshold, based on the emotion signal with the noise canceled.

14. The method of claim 8, wherein the change location is output by selecting, among detected change locations, a location having a greatest degree of change according to a number designated by a user, or by determining a location having a degree of change equal to or greater than a threshold designated by the user.

15. A method of detecting an emotional change through facial expression analysis, the method comprising:

acquiring a moving image including at least one person;

extracting a face image of a user identified from the moving image;

extracting a multi-dimensional facial expression vector from the face image of the user and cumulatively storing the facial expression vector;

extracting an emotion signal from a cumulative value of the multi-dimensional facial expression vector; and detecting a temporal location at which a change rate and magnitude of the emotion signal are equal to or greater than a certain threshold, based on the extracted emotion signal, wherein detecting the temporal location of a sudden emotional change comprises:

splitting an emotion signal of a whole moving image into sub-signals in certain length when a moving image is terminated, calculating a difference between successive sub-signals, and repetitively performing merging based on whether a calculated difference is less than a threshold designated by a user so as to detect, as the change location, a location having a large change in the whole emotion signal, when the moving image is input offline, wherein detecting the temporal location of a sudden emotional change comprises:

calculating a gradient value by differentiating the emotion signal of the moving image of a signal length designated by the user and determining whether a current emotion signal corresponds to a change location by comparing a gradient value of a past signal and a current gradient value, in a case where the moving image is input online in real time.

16. The method of claim 15, further comprising:

extracting landmark location information and posture information from the found face image of the user; and normalizing the face image based on the extracted landmark location information and the posture information.

17. The method of claim 15, wherein extracting and cumulatively storing the facial expression vector comprises:

extracting a seven dimensional (7D) confidence score vector of an emotion category model from the normalized face image; and two-dimensionally adding dimensional regression result values of valence and arousal of a facial expression dimension model.

* * * * *